United States Patent
Fahlbusch et al.

(10) Patent No.: US 11,405,450 B2
(45) Date of Patent: Aug. 2, 2022

(54) IMPLEMENTING CLOUD SERVICES IN USER ACCOUNT ENVIRONMENT

(71) Applicant: SAP SE, Walldorf (DE)

(72) Inventors: Jannick Stephan Fahlbusch, Berlin (DE); Joerg Lenhard, Berlin (DE)

(73) Assignee: SAP SE, Walldorf (DE)

( * ) Notice: Subject to any disclaimer, the term of this patent is extended or adjusted under 35 U.S.C. 154(b) by 140 days.

(21) Appl. No.: 16/872,191

(22) Filed: May 11, 2020

(65) Prior Publication Data
US 2021/0352137 A1 Nov. 11, 2021

(51) Int. Cl.
| | |
|---|---|
| *H04L 67/1001* | (2022.01) |
| *G06F 9/50* | (2006.01) |
| *G06F 11/07* | (2006.01) |
| *G06F 11/34* | (2006.01) |
| *H04L 67/1097* | (2022.01) |
| *G06F 11/14* | (2006.01) |

(52) U.S. Cl.
CPC ......... *H04L 67/1002* (2013.01); *G06F 9/505* (2013.01); *G06F 9/5077* (2013.01); *G06F 11/0709* (2013.01); *G06F 11/1469* (2013.01); *G06F 11/3409* (2013.01); *H04L 67/1097* (2013.01); *G06F 2201/80* (2013.01)

(58) Field of Classification Search
CPC . H04L 67/1002; H04L 67/1097; H04L 63/10; G06F 9/505; G06F 9/5077; G06F 11/0709; G06F 11/1469; G06F 11/3409; G06F 2201/80
See application file for complete search history.

(56) References Cited

U.S. PATENT DOCUMENTS

| | | | |
|---|---|---|---|
| 8,424,058 B2* | 4/2013 | Vinogradov | G06F 21/629 726/3 |
| 10,198,330 B2* | 2/2019 | Boshev | G06F 11/3696 |
| 11,146,569 B1* | 10/2021 | Brooker | G06F 9/45558 |
| 2021/0119874 A1* | 4/2021 | Ryman | H04L 41/042 |

\* cited by examiner

*Primary Examiner* — Michael A Keller
(74) *Attorney, Agent, or Firm* — Schwegman Lundberg & Woessner, P.A.

(57) ABSTRACT

Techniques for implementing cloud services of a cloud service provider in a dedicated user account environment in a distributed computing system are disclosed. In some example embodiments, a computer-implemented method comprises: receiving, by a management system of a cloud service provider, a user request for creation of an instance of an application platform of the cloud service provider in a user environment within a distributed computing system, the user environment being dedicated to a user account hosted by the distributed computing system, the user request comprising credential data configured to provide the management system with limited permission for accessing the user environment, the limited permission restricting the management system from full administrative privileges in accessing the user environment; and deploying, by the management system, the instance of the application platform to a workload cluster in the user environment using the credential data to access the user environment.

20 Claims, 6 Drawing Sheets

IMPLEMENTING CLOUD SERVICES IN USER ACCOUNT ENVIRONMENT

TECHNICAL FIELD

The present application relates generally to the technical field of electrical computer systems, and, in various embodiments, to systems and methods of implementing cloud services of a cloud service provider in a dedicated user account environment in a distributed computing system.

BACKGROUND

In cloud computing environments, application workload is often dispersed over various systems, accounts, and networks. For example, cloud service databases of users of a cloud service provider may be run in a workload cluster that is owned and operated by the cloud service provider. The network environment of the workload cluster is separate from the user's network environment. The separation between the user's network environment and the network environment in which the workload cluster running the cloud services resides results in latency in the transmission of data when the user attempts to use the cloud services. Additionally, many users want to have the advantages of cloud computing (e.g., elasticity, ease of management, scalability, etc.), but still want to have sovereignty over their own data. However, there is a technical problem in providing users with sovereignty over their own data, since their data resides within the workload cluster owned and operated by the cloud service provider, leaving their data exposed to being accessed by the cloud service provider. In addition to the data transmission latency problems and the data security problems discussed above, other technical problems may arise as well.

BRIEF DESCRIPTION OF THE DRAWINGS

Some example embodiments of the present disclosure are illustrated by way of example and not limitation in the figures of the accompanying drawings, in which like reference numbers indicate similar elements.

DETAILED DESCRIPTION

Figure 1:
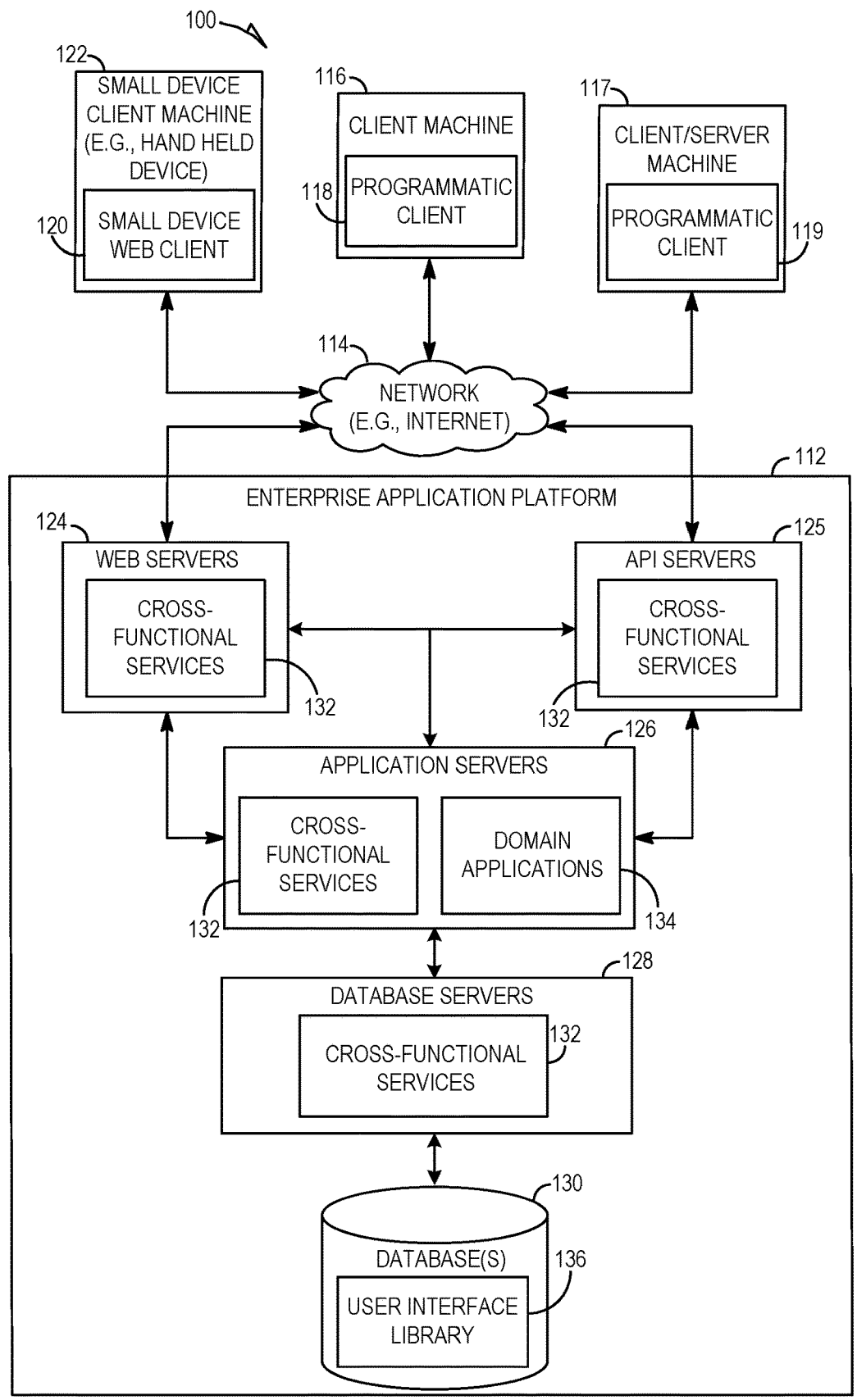
FIG. 1 is a network diagram illustrating a system, in accordance with some example embodiments.

Example methods and systems for implementing cloud services of a cloud service provider in a dedicated user account environment in a distributed computing system are disclosed. In the following description, for purposes of explanation, numerous specific details are set forth in order to provide a thorough understanding of example embodiments. It will be evident, however, to one skilled in the art that the present embodiments can be practiced without these specific details.

The implementation of the features disclosed herein involves a non-generic, unconventional, and non-routine operation or combination of operations. By applying one or more of the solutions disclosed herein, some technical effects of the system and method of the present disclosure are to provide a computer system that is specially-configured to implement cloud services of a cloud service provider in a dedicated user account environment in a distributed computing system. In some example embodiments, a management system in a provider environment dedicated to a cloud service provider account of the cloud service provider in a distributed computing system is provided with credential data from a computing device of a user as part of a request for creation of an instance of an application platform of the user. The management system uses the credential data to deploy the instance of the application platform to a workload cluster in a user environment dedicated to a user account in the distributed computing system, such that the instance of the application platform is hosted in the user environment dedicated to the user account rather than being hosted in the provider environment. The management system may also deploy a workload cluster in the user environment if there is no workload cluster existing or otherwise available in the user environment at the time that the management system attempts to deploy the instance of the application platform in the user environment. The credential data is configured to provide the management system with limited permission for accessing the user environment, restricting the management system from full administrative privileges in accessing the user environment.

As a result of the management system of the cloud service provider deploying the instance of the application platform to the user environment, the instance of the application platform and any data used or generated by the instance of the application platform are hosted closer to other applications in the user environment that depend on the instance of the application platform and such data, thereby solving the above-discussed data transmission latency problem. Additionally, the above-discussed data security problem is solved by limiting the access privileges of the cloud service provider with respect to the instance of the application platform and any data used or generated by the instance of the application platform. Other technical effects will be apparent from this disclosure as well.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and benefits of the subject matter described herein will be apparent from the description and drawings, and from the claims.

FIG. 1 is a network diagram illustrating a system 100, in accordance with some example embodiments. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The web servers 124, API servers 125, application servers 126, and database servers 128 can host cross-functional services 132. The cross-functional services 132 can include relational database modules to provide support services for access to the database(s) 130, which includes a user interface library 136. The application servers 126 can further host domain applications 134. The web servers 124 and the API servers 125 may be combined.

The cross-functional services 132 provide services to users and processes that utilize the enterprise application platform 112. For instance, the cross-functional services 132 can provide portal services (e.g., web services), database services, and connectivity to the domain applications 134 for users that operate the client machine 116, the client/server machine 117, and the small device client machine 122. In addition, the cross-functional services 132 can provide an environment for delivering enhancements to existing applications and for integrating third-party and legacy applications with existing cross-functional services 132 and domain applications 134. In some example embodiments, the system 100 comprises a client-server system that employs a client-server architecture, as shown in FIG. 1. However, the embodiments of the present disclosure are, of course, not limited to a client-server architecture, and could equally well find application in a distributed, or peer-to-peer, architecture system.

The enterprise application platform 112 can improve (e.g., increase) accessibility of data across different environments of a computer system architecture. For example, the enterprise application platform 112 can effectively and efficiently enable a user to use real data created from use by one or more end users of a deployed instance of a software solution in a production environment when testing an instance of the software solution in the development environment. The enterprise application platform 112 is described in greater detail below in conjunction with FIGS. 2-5.

Figure 2:
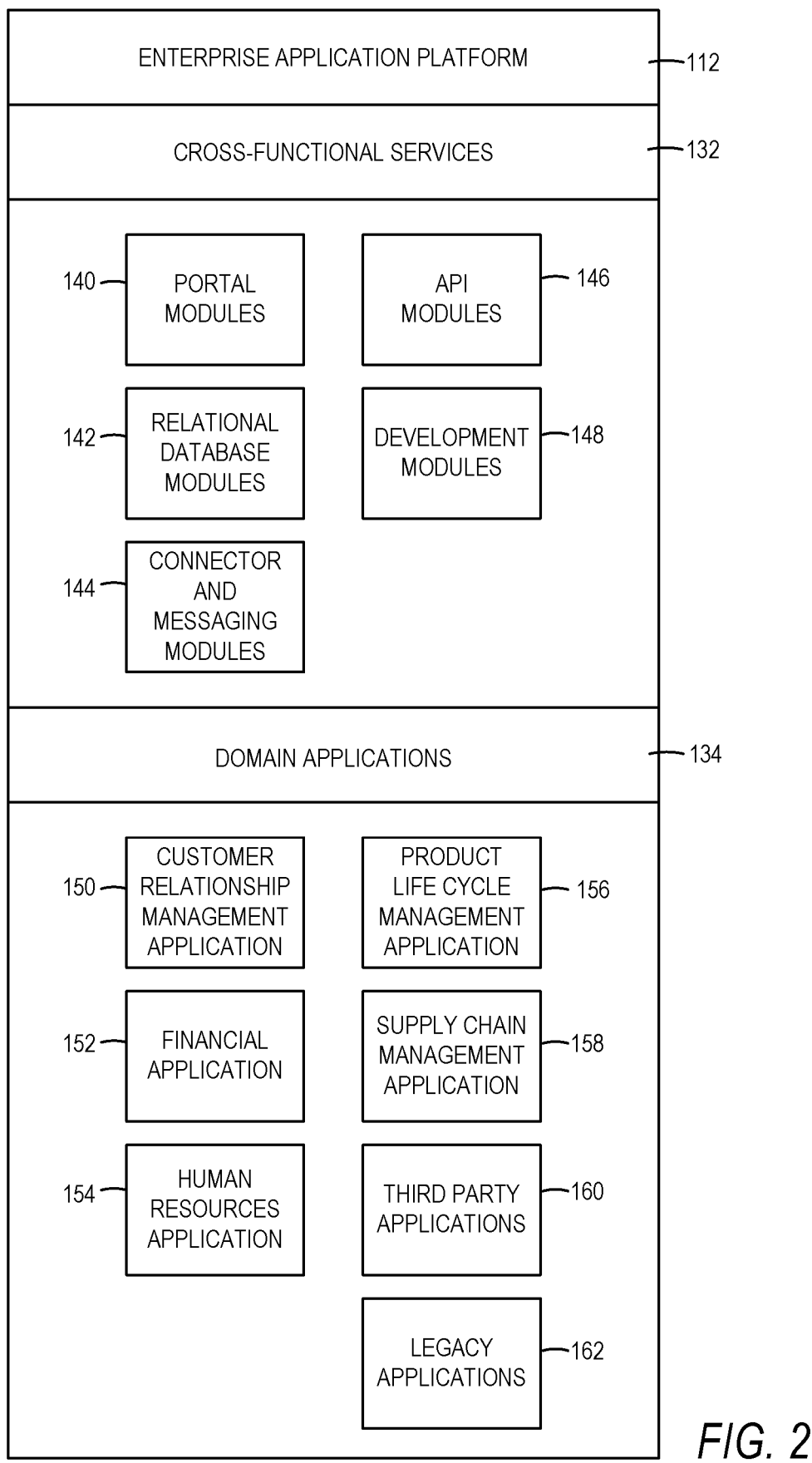
FIG. 2 is a block diagram illustrating enterprise applications and services in an enterprise application platform, in accordance with some example embodiments.

FIG. 2 is a block diagram illustrating enterprise applications and services in an enterprise application platform 112, in accordance with an example embodiment. The enterprise application platform 112 can include cross-functional services 132 and domain applications 134. The cross-functional services 132 can include portal modules 140, database modules 142 (e.g., relational database modules), connector and messaging modules 144, API modules 146, and development modules 148.

The portal modules 140 can enable a single point of access to other cross-functional services 132 and domain applications 134 for the client machine 116, the small device client machine 122, and the client/server machine 117. The portal modules 140 can be utilized to process, author and maintain web pages that present content (e.g., user interface elements and navigational controls) to the user. In addition, the portal modules 140 can enable user roles, a construct that associates a role with a specialized environment that is utilized by a user to execute tasks, utilize services, and exchange information with other users within a defined scope. For example, the role can determine the content that is available to the user and the activities that the user can perform. The portal modules 140 include a generation module, a communication module, a receiving module and a regenerating module. In addition, the portal modules 140 can comply with web services standards and/or utilize a variety of Internet technologies including JAVA®, J2 EE, SAP's Advanced Business Application Programming Language (ABAP®) and Web Dynpro, XML, JCA, JAAS, X.509, LDAP, WSDL, WSRR, SOAP, UDDI and MICROSOFT® .NET®.

The database modules 142 can provide support services for access to the database(s) 130, which includes a user interface library 136. The database modules 142 can provide support for object relational mapping, database independence, and distributed computing. The database modules 142 can be utilized to add, delete, update, and manage database elements. In addition, the database modules 142 can comply with database standards and/or utilize a variety of database technologies including SQL, SQLDBC, Oracle, MySQL, Unicode, JDBC, or the like.

The connector and messaging modules 144 can enable communication across different types of messaging systems that are utilized by the cross-functional services 132 and the domain applications 134 by providing a common messaging application processing interface. The connector and messaging modules 144 can enable asynchronous communication on the enterprise application platform 112.

The API modules 146 can enable the development of service-based applications by exposing an interface to existing and new applications as services. Repositories can be included in the platform as a central place to find available services when building applications.

The development modules 148 can provide a development environment for the addition, integration, updating, and extension of software components on the enterprise application platform 112 without impacting existing cross-functional services 132 and domain applications 134.

Turning to the domain applications 134, a customer relationship management application 150 can enable access to and can facilitate collecting and storing of relevant personalized information from multiple data sources and business processes. Enterprise personnel that are tasked with developing a buyer into a long-term customer can utilize the customer relationship management applications 150 to provide assistance to the buyer throughout a customer engagement cycle.

Enterprise personnel can utilize financial applications 152 and business processes to track and control financial transactions within the enterprise application platform 112. The financial applications 152 can facilitate the execution of operational, analytical, and collaborative tasks that are associated with financial management. Specifically, the financial applications 152 can enable the performance of tasks related to financial accountability, planning, forecasting, and managing the cost of finance.

Human resource applications 154 can be utilized by enterprise personnel and business processes to manage, deploy, and track enterprise personnel. Specifically, the human resource applications 154 can enable the analysis of human resource issues and facilitate human resource decisions based on real-time information.

Product life cycle management applications 156 can enable the management of a product throughout the life cycle of the product. For example, the product life cycle management applications 156 can enable collaborative engineering, custom product development, project management, asset management, and quality management among business partners.

Supply chain management applications 158 can enable monitoring of performances that are observed in supply chains. The supply chain management applications 158 can facilitate adherence to production plans and on-time delivery of products and services.

Third-party applications 160, as well as legacy applications 162, can be integrated with domain applications 134 and utilize cross-functional services 132 on the enterprise application platform 112.

Figure 3:
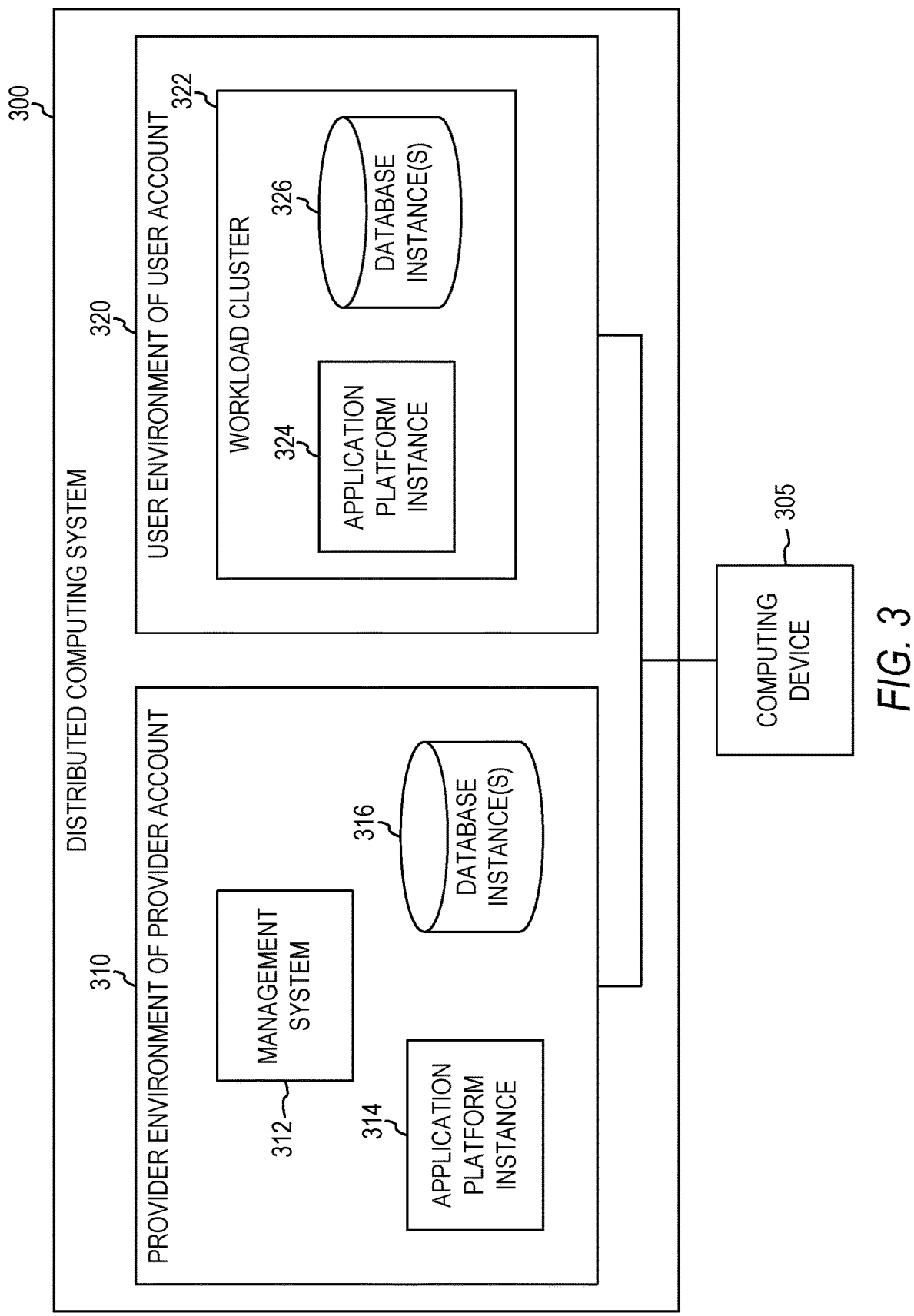
FIG. 3 is a block diagram illustrating a distributed computing system, in accordance with some example embodiments.

FIG. 3 is a block diagram illustrating a distributed computing system 300, in accordance with some example embodiments. Distributed computing is a model in which components of a software system are shared among multiple computers to improve efficiency and performance. In a distributed computing system, such as the distributed computing system 300, components of the distributed computing system are located on different networked computers that communicate and coordinate their actions by passing messages to one another.

In some example embodiments, the distributed computing system 300 comprises a hyperscaling architecture, also referred to as a hyperscaler, configured to scale appropriately as increased demand is added to the distributed computing system 300. The hyperscaling architecture is configured to seamlessly provision and add compute, memory, networking, and storage resources to a given node or set of nodes that make up a larger computing environment and may employ massively scalable server architectures and virtual networking. The hyperscaling architecture may quickly accommodate an increased demand for Internet-facing and back-end computing resources without requiring additional physical space, cooling, or electrical power. The hyperscaling infrastructure is designed for horizontal scalability and leads to high levels of performance, throughput, and redundancy to enable fault tolerance and high availability.

In some example embodiments, the distributed computing system 300 is configured to host cloud services of cloud service providers. A cloud service is any online service made available to users on demand via the Internet from servers owned and managed by a cloud service provider as opposed to being provided from a user's own on-premises servers. An enterprise application platform, such as the enterprise application platform 112 in FIGS. 1-2, may be offered as a cloud service hosted by the distributed computing system 300.

In some example embodiments, the distributed computing system 300 is configured to provide a variety of user interface functionality, such as generating user interfaces, interactively presenting user interfaces to the user, receiving information from the user (e.g., interactions with user interfaces), and so on. Presenting information to the user can include causing presentation of information to the user (e.g., communicating information to a device with instructions to present the information to the user). Information may be presented using a variety of means including visually displaying information and using other device outputs (e.g., audio, tactile, and so forth). Similarly, information may be received via a variety of means including alphanumeric input or other device input (e.g., one or more touch screen, camera, tactile sensors, light sensors, infrared sensors, biometric sensors, microphone, gyroscope, accelerometer, other sensors, and so forth). In some example embodiments, the distributed computing system 300 is configured to receive user input. For example, the distributed computing system 300 can present one or more graphical user interface (GUI) elements (e.g., drop-down menu, selectable buttons, text field) with which a user can submit input. In some example embodiments, the distributed computing system 300 is configured to perform various communication functions to facilitate the functionality described herein, such as by communicating with a computing device 305 of a user (e.g., the small device client machine 122, the client machine 116, or the client/server machine 117) via the network 114 using a wired or wireless connection.

In some example embodiments, the distributed computing system 300 manages different environments that are dedicated to different accounts. For example, in FIG. 3, the distributed computing system 300 manages a provider environment 310 and a user environment 320. The provider environment 310 is dedicated to a provider account of a cloud service provider, while the user environment 320 is dedicated to a user account of a human user or of some other entity, such as a company. The provider environment 310 and the user environment 320 are isolated from one another, such that access to one of the environments does not guarantee access to the other environment.

The provider environment 310 and the user environment 320 may control access to their respective components using an access control service that involves authenticating and authorizing human users and computer system components to determine whether to grant access and, if so, what type of access to grant. In some example embodiments, the provider environment 310 and the user environment 320 use different user types to determine what type of access to grant human users and computer system components. Each user type may refer to a data security applied to human users and computer system components that correspond to that user type. For example, a normal dialog user type may be used for users associated with the user account to which the user environment 320 is dedicated (e.g., employees of a company to whom the user account belongs) and may be used to permit the users associated with the user account to access to all applications and data residing in the user environment 320, whereas a technical user type may be used for computer system components external to the user environment 320, such as computer system components residing in the provider environment 310, and may be used to grant the external computer system components limited access to the user environment 320 only to perform a limited set of functions affecting the user environment 320. The limited access granted to the external computer system components of the technical user type restricts the external computer system components from performing the full set of functions available to users of the normal dialog user type within the user environment 320.

In some example embodiments, the provider environment 310 and the user environment 320 use credential data to determine what user type, if any, a human user or a computer system component requesting access the respective environment belongs to, and, therefore, what type or amount of access to grant to the human user or computer system component requesting access. Examples of credential data include, but are not limited to, any user name, identification number, password, electronic certificate, license or security key, security token, PIN or other security code, method, technology or device used, alone or in combination, to verify an user's or computer system component's identity and authorization to access a particular environment, such as the provider environment 310 and the user environment 320.

In some example embodiments, the provider environment 310 comprises a management system 312. The management system 312 may be configured to provision a workload cluster within the provider environment 310, and then deploy an instance 314 of an application platform of the cloud service provider to the workload cluster, such that the instance 314 of the application platform is hosted within the provider environment 310, such as within the workload cluster in the provider environment 310. In some example embodiments, the instance 314 of the application platform comprises an instance of the enterprise application platform 112. The instance 314 of the application platform may be used by a user to create one or more database instances 316 within the provider environment 310, such that use of the database instance(s) 316 requires full access, rather than limited access, to the provider environment 310. In some example embodiments, each database instance 316 may comprise an in-memory, column-oriented, relational database management system that functions as a database server for storing and retrieving data as requested by users or applications. Each database instance 316 may be configured to perform predictive analytics functions or other advanced analytics functions, such as spatial data processing, text analytics, text search, streaming analytics, and graph data processing. The database instance(s) 316 may also be configured to perform extract, transform, load (ETL) functions.

The management system 312 may present a user with an option, such as via one or more user interface elements displayed on the computing device 305, to request the creation of the application platform instance 314 and the database instance(s) 316 within the provider environment 310. The management system 312 may additionally or alternatively present the user with an option, such as via one or more user interface elements displayed on the computing device 305, to request the creation of an instance of the application platform within the user environment 320 instead of within the provider environment 310.

In some example embodiments, the management system 312 is configured to receive a user request for creation of an instance 324 of the application platform of the cloud service provider in the user environment 320. The user request comprises credential data configured to provide the management system 312 with limited permission for accessing the user environment 320. In some example embodiments, the limited permission restricts the management system 312 from full administrative privileges in accessing the user environment 320. For example, the limited permission enables the management system 312 to access the user environment 320 to deploy the instance 324 of the application platform in a workload cluster 322 within the user environment 322. The instance 324 of the application platform may then be run in the workload cluster 322 in the user environment 320 to provide, from within the user environment 320, one or more cloud services of the cloud service provider to one or more users associated with the user account of the user environment 320, such as users of the normal dialog user type.

In some example embodiments, authorized users of the user environment 320 can use the instance 324 of the application platform 324 to create one or more database instances 326 within the user environment 320, such that use of the database instance(s) 326 requires full access, rather than limited access, to the user environment 320. In some example embodiments, each database instance 326 may comprise an in-memory, column-oriented, relational database management system that functions as a database server for storing and retrieving data as requested by users or applications. Each database instance 326 may be configured to perform predictive analytics functions or other advanced analytics functions, such as spatial data processing, text analytics, text search, streaming analytics, and graph data processing. The database instance(s) 326 may also be configured to perform extract, transform, load (ETL) functions. The limited permission corresponding to the credential data used by the management system 312 to access the user environment 320 is also configured to prevent the management system 312 from accessing any data uploaded by users of the user environment 320 or any data stored in the user environment as a result of users of the user environment 320 using the instance 324 of the application platform or the database instances 326.

In some example embodiments, the instance 324 of the application platform that is deployed and hosted within the user environment 320 is configured to detect technical problems arising with the database instance(s) 326 within the user environment 320, and then to perform one or more operations to fix or resolve the technical problems in response to their detection. Examples of technical problems that may be detected include, but are not limited to, database failures experienced by or occurring in association with the database instance(s) 326, such as hardware failures (e.g., memory errors, disk crashes, bad disk sectors, and overloading) and software failures (e.g., failures related to an operating system, database management system software, and other software applications). In some example embodiments, the instance 324 of the application platform is configured to detect a failure of the database instance 326 and to perform a database recovery operation in response to the detection of the failure of the database instance 326. For example, the instance 324 of the application platform may detect a failure event in which data in the database instance 326 has become inconsistent or lost, such as from an operating system crash terminating one or more processes being performed by the database instance 326, a crash of the database instance 326, or hardware failure. In response to or otherwise based on the detection of the failure event, the instance 324 of the application platform may then perform one or more operations restoring the database instance 326 and the data to a consistent state, such as by restoring lost data up to the point of the failure event (e.g. system crash).

In some example embodiments, the management system 312 is configured to perform software updates for the instance 324 of the application platform using its limited access to the user environment 320. For example, the management system 312 may detect that a software update for the application platform has become available, such as by detecting an indication of the newly-available software update in a data storage within the provider environment 310, and then update the instance 324 of the application platform in the workload cluster 322 in the user environment 320 based on the software update using the credential data to access the user environment 320 in response to or otherwise based on the detection of the software update.

Figure 4:
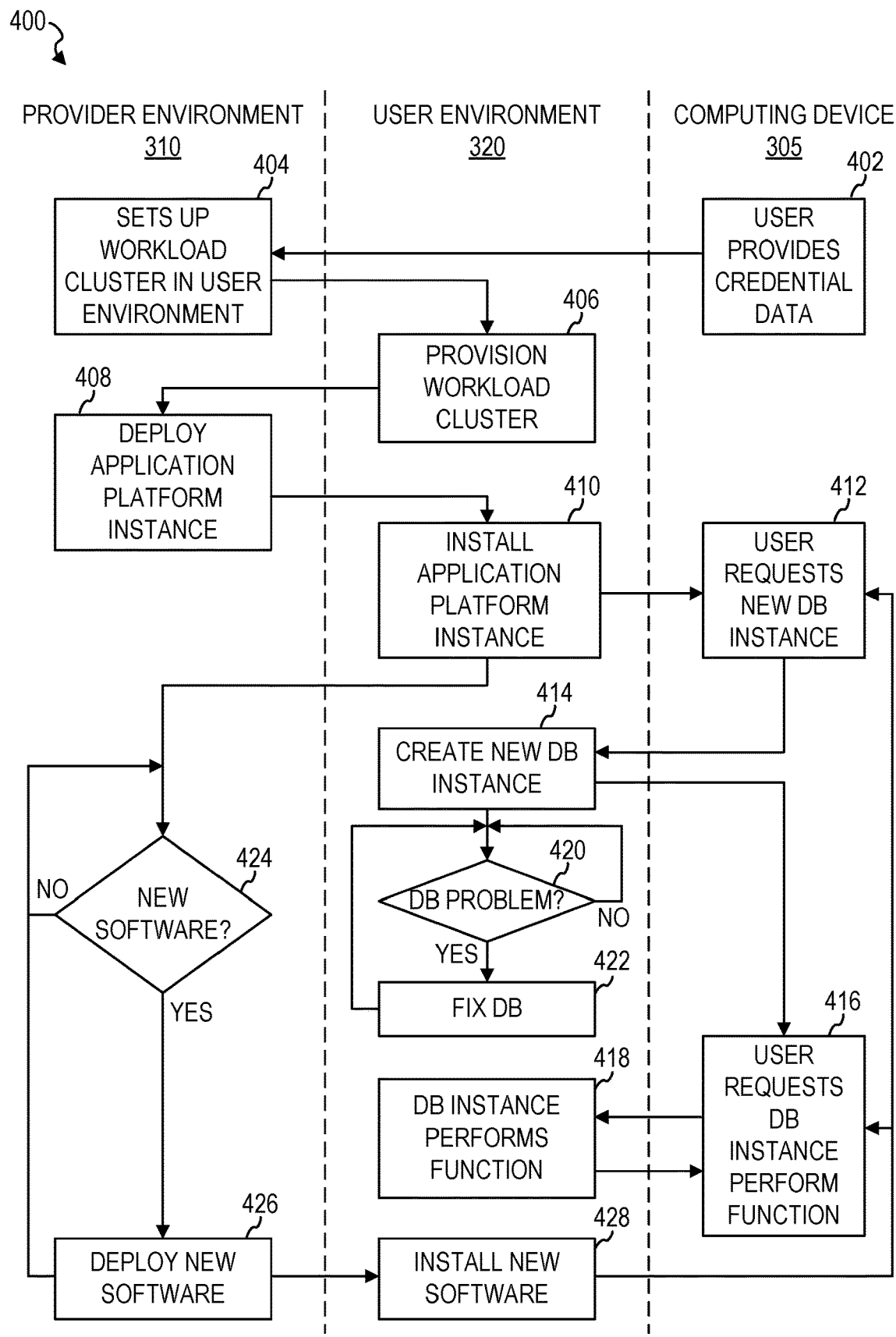
FIG. 4 is an operational flow diagram for implementing cloud services in a user environment dedicated to a user account in a distributed computing system, in accordance with some example embodiments.

FIG. 4 is an operational flow diagram 400 for implementing cloud services in the user environment 320 dedicated to the user account in the distributed computing system 300, in accordance with some example embodiments. The operational flow diagram 400 shows operations performed within the provider environment 310, the user environment 320, and the computing device 305, which are isolated from one another, as represented by the vertical dotted lines separating them.

At operation 402, a user provides credential data as part of a user request for creation of an instance 324 of an application platform of a cloud service provider in the user environment 320. The user request including the credential data is transmitted from the computing device 305 to the provider environment 310, such as to the management system 312 in the provider environment 310.

Thereafter, at operation 404, the management system 312 in the provider environment 310 sets up a workload cluster 322 in the user environment 320. For example, the management system 312 may transmit a request to the user environment 320 to provision the workload cluster 322 in the user environment 320. The request may include the credential data.

The user environment 320 receives the request to provision the workload cluster 322, at operation 406, and then provisions the workload cluster 322 within the user environment 320 based on the received request. In some example embodiments, the user environment 320 grants the request to provision the workload cluster 322 within the user environment 320 based on the credential data included in the request.

At operation 408, the management system 408 deploys an instance 324 of the application platform to the workload cluster 322 in the user environment 320 using the credential data to access the user environment 320. For example, the management system 312 may transmit a request to the user environment 320 to install the instance 324 of the application platform in the workload cluster 322 within the user environment 320. The request may include the credential data.

As shown at operation 410, the user environment 320 receives the request to install the instance 324 of the application platform, and installs the instance 324 of the application platform on the workload cluster 322 in the user environment 320 based on the received request. In some example embodiments, the user environment 320 grants the request to install the instance 324 of the application platform on the workload cluster 322 within the user environment 320 based on the credential data included in the request. After the instance 324 of the application platform is installed on the workload cluster 322 in the user environment 320, the workload cluster 322 may report to the user that the instance 324 of the application platform is ready for use in the user environment 320, such as by transmitting a notification to the computing device 305 indicating that the instance 324 of the application platform is ready for use in the user environment 320.

After receiving notification of the instance 324 of the application platform being ready for use in the user environment 320, the user uses the computing device 305 to issue a request that a new database instance 326 be created using the instance 324 of the application platform, as shown at operation 412. The user may use his or her own credential data in accessing the user environment 320. The credential data of the user may be provided to the user environment 320 via the computing device 305 each time the user submits a request to be carried out within the user environment 320 or may be provided a single time by the user to keep the user logged in to the user environment 320 for continuous access.

At operation 414, the instance 324 of the application platform on the workload cluster 322 in the user environment 320 receives the request to create a new database instance 326, and then creates the new database instance 326 on the workload cluster 322 in the user environment 320 based on the received request. The instance 324 of the application platform may transmit a notification to the user via the computing device 305 indicating that the new database instance 326 has been created on the workload cluster 322 in the user environment 320 and is ready for use by the user.

Thereafter, at operation 416, the user requests that the database instance 326 in the user environment 320 perform one or more functions. For example, the user may use the instance 324 of the application platform on the workload cluster 322 in the user environment 320 select one or more user interface elements displayed on the computing device 305 to trigger performance of the requested function(s) by the database instance 326.

The database instance 418 on the workload cluster 322 in the user environment 320 performs the requested function (s), at operation 418. Results or output of the performance of the requested function(s) may be displayed to the user on the computing device 305. The user may continue to request the performance of functions by the database instance 326 at operation 416 and the database instance 326 may continue to perform the requested functions at operation 418.

Additionally, after the creation of the new database instance 326 at operation 414, the instance 324 of the application platform may repeatedly perform health checks of the database instance 326, at operation 420, to detect any technical problems arising with the database instance 326 within the user environment 320, and then to perform one or more operations to fix or resolve the technical problems in response to their detection. Examples of technical problems that may be detected include, but are not limited to, database failures experienced by or occurring in association with the database instance(s) 326, such as hardware failures (e.g., memory errors, disk crashes, bad disk sectors, and overloading) and software failures (e.g., failures related to an operating system, database management system software, and other software applications).

If it is determined, at operation 420, that a technical problem has occurred with the database instance 326, then the instance 324 of the application platform performs one or more operations to fix the technical problem, at operation 422, such as by performing a database recovery operation. After the technical problem is fixed at operation 422, the instance 324 of the application platform may continue to perform health checks of the database instance 326, at operation 420.

Additionally, after the instance 324 of the application platform is installed on the workload cluster 322 in the user environment 320, the management system 312 in the provider environment 310 may repeatedly perform software updates of the instance 324 of the application platform in the user environment 320, such as by repeatedly performing update checks to detect if a software update for the application platform has become available, at operation 424. If it is determined at operation 424 that a software update is available, then the management system 312 may deploy the software update to the user environment 320, at operation 426, to update the instance 324 of the application platform in the workload cluster 322 in the user environment 320 based on the software update using the credential data to access the user environment 320. At operation 428, the workload cluster 322 may receive a request from the management system 312 to update the instance 324 of the application platform in the workload cluster 322. The request may comprise the software update, such as a new version of the instance 324 of the instance of the application platform or a patch for the instance 324 of the application platform. The workload cluster 322 may install the software update at operation 428 based on the request and the limited credential data of the management system 312. After the software update is installed at operation 428, the user may use the updated version of the instance 324 of the application platform, such as by requesting the creation of new database instances at operation 412 or requesting that the database instance 326 perform one or more functions at operation 416.

Figure 5:
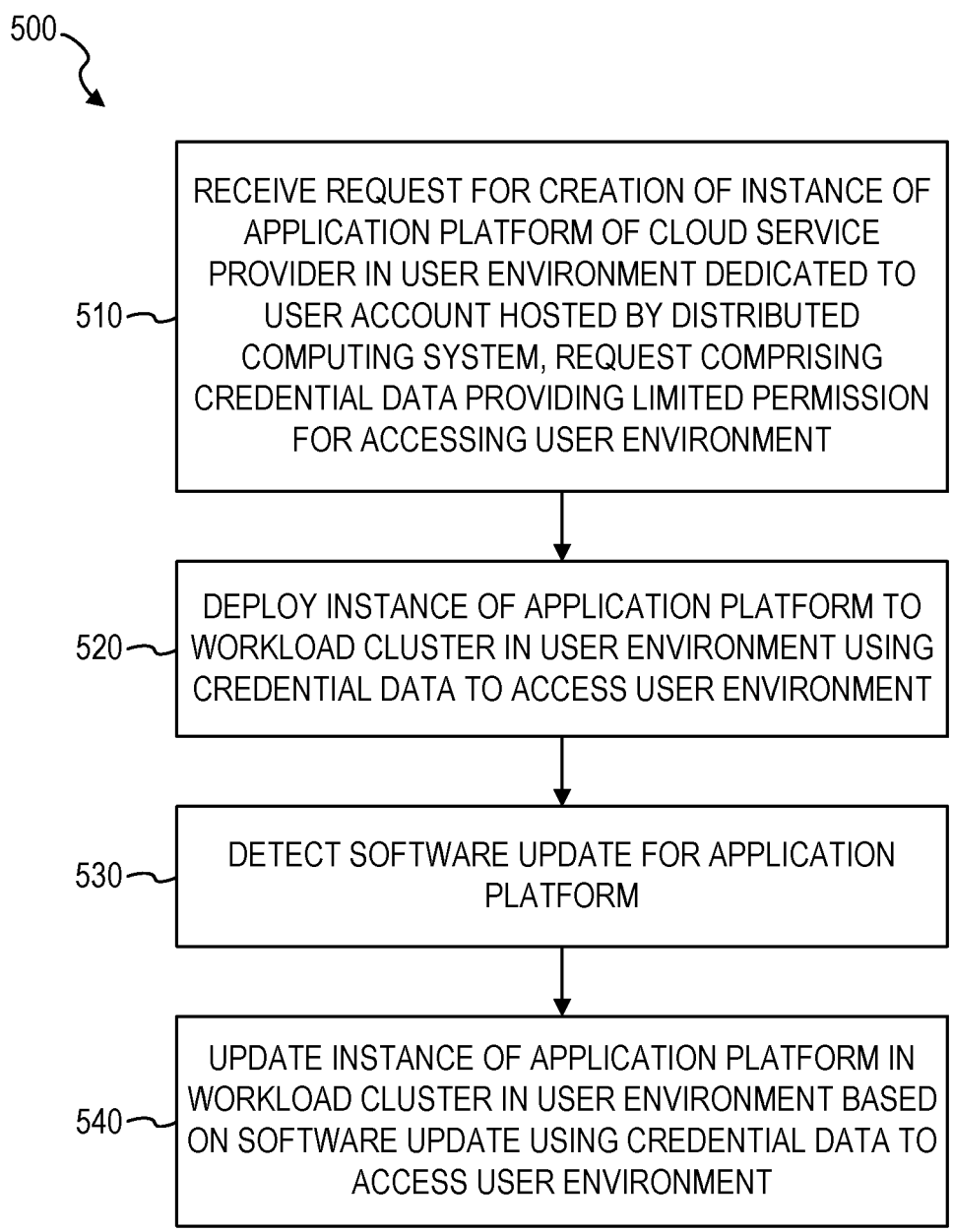
FIG. 5 is a flowchart illustrating a method of implementing cloud services in a user environment dedicated to a user account in a distributed computing system, in accordance with some example embodiments.

FIG. 5 is a flowchart illustrating a method 500 of implementing cloud services in a user environment dedicated to a user account in a distributed computing system, in accordance with some example embodiments. The method 500 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 500 are performed by a management system of a cloud service provider, such as the management system 312 in FIG. 3.

At operation 510, the management system 312 receives a user request for creation of an instance 324 of an application platform of the cloud service provider in a user environment 320 within a distributed computing system 300. In some example embodiments, the user environment 320 is dedicated to a user account hosted by the distributed computing system 300. The user request may comprise credential data that is configured to provide the management system 312 with limited permission for accessing the user environment 320. In some example embodiments, the limited permission restricts the management system 312 from full administrative privileges in accessing the user environment 320.

The management system 312 may reside in a provider environment 310 within the distributed computing system 300. In some example embodiments, the provider environment 310 is separate from the user environment 320 and dedicated to a cloud service provider account hosted by the distributed computing system 300, with the cloud service provider account being different from the user account and belonging to the cloud service provider, and the cloud service provider having full administrative privileges in accessing the provider environment 310.

At operation 520, the management system 312 deploys the instance 324 of the application platform of the cloud service provider to a workload cluster 322 in the user environment 320 based on the received user request using the credential data to access the user environment 320. In some example embodiments, the instance 324 of the application platform is deployed to be run in the workload cluster 322 in the user environment 320 to provide, from within the user environment 320, one or more cloud services of the cloud service provider to one or more users associated with the user account. The deployed instance 324 of the application platform may be configured to receive another user request for creation of a database instance 326 from a computing device 305 of a user, with the user being associated with the user account, and then create the database instance 326 in the workload cluster 322 in the user environment 320 based on the other user request. The database instance 326 may be configured to perform one or more predictive analytics functions. However, the database instance 326 may be configured to perform one or more other functions as well.

Thereafter, at operation 530, the management system 312 detects a software update for the application platform. In some example embodiments, the management system 312 detects an indication of the software update in a data storage within the provider environment 310. However, the management system 312 may detect the software update for the application platform in other ways as well At operation 540, the management system 312 updates the instance 324 of the application platform in the workload cluster 322 in the user environment 320 based on the software update using the credential data to access the user environment 320 in response to the detecting of the software update at operation 530. For example, the management system 312 may transmit a request for installation of the software update to the workload cluster 322 in the user environment 320, where the request for installation comprises the software update. The credential data of the management system 312 may be used to grant the request for installation.

It is contemplated that any of the other features described within the present disclosure can be incorporated into the method 500.

The following paragraphs provide example embodiments.

Example 1 includes a computer-implemented method performed by a computer system having a memory and at least one hardware processor, the computer-implemented method comprising: receiving, by a management system of a cloud service provider, a user request for creation of an instance of an application platform of the cloud service provider in a user environment within a distributed computing system, the user environment being dedicated to a user account hosted by the distributed computing system, the user request comprising credential data configured to provide the management system with limited permission for accessing the user environment, the limited permission restricting the management system from full administrative privileges in accessing the user environment; and deploying, by the management system, the instance of the application platform of the cloud service provider to a workload cluster in the user environment based on the received user request using the credential data to access the user environment, the instance of the application platform being deployed to be run in the workload cluster in the user environment to provide, from within the user environment, one or more cloud services of the cloud service provider to one or more users associated with the user account.

Example 2 includes the computer-implemented method of example 1, wherein the deployed instance of the application platform is configured to: receive another user request for creation of a database instance from a computing device of a user, the user being associated with the user account; and create the database instance in the workload cluster in the user environment based on the other user request.

Example 3 includes the computer-implemented method of example 1 or example 2, wherein the limited permission restricts the management system from accessing user environment data stored in the user environment, the user environment data having been stored in the user environment based on use of the database instance by the user associated with the user account.

Example 4 includes the computer-implemented method of any one of examples 1 to 3, wherein the database instance is configured to perform one or more predictive analytics functions.

Example 5 includes the computer-implemented method of any one of examples 1 to 4, wherein the deployed instance of the application platform is configured to: detect a failure of the database instance; and performing a database recovery operation in response to the detecting of the failure of the database instance.

Example 6 includes the computer-implemented method of any one of examples 1 to 5, wherein the management system resides in a provider environment within the distributed computing system, the provider environment being separate from the user environment and dedicated to a cloud service provider account hosted by the distributed computing system, the cloud service provider account being different from the user account and belonging to the cloud service provider, and the cloud service provider having full administrative privileges in accessing the provider environment.

Example 7 includes the computer-implemented method of any one of examples 1 to 6, further comprising: detecting, by the management system, a software update for the application platform; and updating, by the management system, the instance of the application platform in the workload cluster in the user environment based on the software update using the credential data to access the user environment in response to the detecting of the software update.

Example 8 includes a system comprising: at least one processor; and a non-transitory computer-readable medium storing executable instructions that, when executed, cause the at least one processor to perform the method of any one of examples 1 to 7.

Example 9 includes a non-transitory machine-readable storage medium, tangibly embodying a set of instructions that, when executed by at least one processor, causes the at least one processor to perform the method of any one of examples 1 to 7.

Example 10 includes a machine-readable medium carrying a set of instructions that, when executed by at least one processor, causes the at least one processor to carry out the method of any one of examples 1 to 7.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 114 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 6:
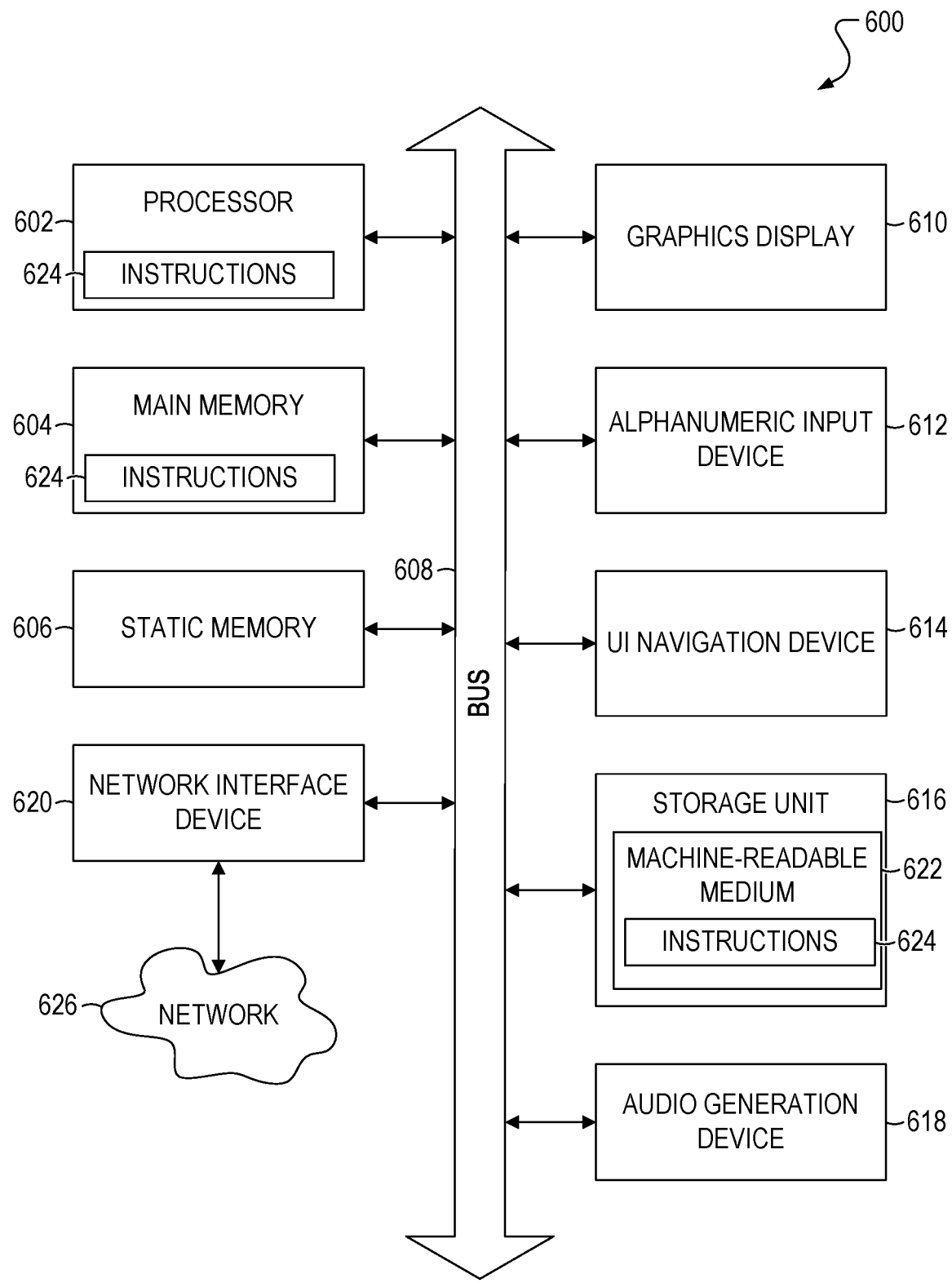
FIG. 6 is a block diagram of an example computer system on which methodologies described herein can be executed, in accordance with some example embodiments.

FIG. 6 is a block diagram of a machine in the example form of a computer system 600 within which instructions 624 for causing the machine to perform any one or more of the methodologies discussed herein may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604, and a static memory 606, which communicate with each other via a bus 608. The computer system 600 may further include a graphics or video display unit 610 (e.g., a liquid crystal display (LCD) or a cathode ray tube (CRT)). The computer system 600 also includes an alphanumeric input device 612 (e.g., a keyboard), a user interface (UI) navigation (or cursor control) device 614 (e.g., a mouse), a storage unit (e.g., a disk drive unit) 616, an audio or signal generation device 618 (e.g., a speaker), and a network interface device 620.

The storage unit 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media. The instructions 624 may also reside, completely or at least partially, within the static memory 606.

While the machine-readable medium 622 is shown in an example embodiment to be a single medium, the term "machine-readable medium" may include a single medium or multiple media (e.g., a centralized or distributed database, and/or associated caches and servers) that store the one or more instructions 624 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 624 may further be transmitted or received over a communications network 626 using a transmission medium. The instructions 624 may be transmitted using the network interface device 620 and any one of a number of well-known transfer protocols (e.g., HTTP). Examples of communication networks include a LAN, a WAN, the Internet, mobile telephone networks, POTS networks, and wireless data networks (e.g., WiFi and WiMAX networks). The term "transmission medium" shall be taken to include any intangible medium capable of storing, encoding, or carrying instructions for execution by the machine, and includes digital or analog communications signals or other intangible media to facilitate communication of such software.

Each of the features and teachings disclosed herein can be utilized separately or in conjunction with other features and teachings to provide a system and method for blind spot implementation in neural networks. Representative examples utilizing many of these additional features and teachings, both separately and in combination, are described in further detail with reference to the attached figures. This detailed description is merely intended to teach a person of skill in the art further details for practicing certain aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The example methods or algorithms presented herein are not inherently related to any particular computer or other apparatus. Various general purpose systems, computer servers, or personal computers may be used with programs in accordance with the teachings herein, or it may prove convenient to construct a more specialized apparatus to perform the method steps disclosed herein. The structure for a variety of these systems will appear from the description herein. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to aid in understanding how the present teachings are practiced, but not intended to limit the dimensions and the shapes shown in the examples.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computer-implemented method performed by a computer system having a memory and at least one hardware processor, the computer-implemented method comprising:

receiving, by a management system of a cloud service provider, a user request for creation of an instance of an application platform of the cloud service provider in a user environment within a distributed computing system, the user environment being dedicated to a user account hosted by the distributed computing system, the user request comprising credential data configured to provide the management system with limited permission for accessing the user environment, the limited permission restricting the management system from full administrative privileges in accessing the user environment;

deploying, by the management system, the instance of the application platform of the cloud service provider to a workload cluster in the user environment based on the received user request using the credential data to access the user environment, the instance of the application platform being deployed to be run in the workload cluster in the user environment to provide, from within the user environment, one or more cloud services of the cloud service provider to one or more users associated with the user account;

detecting, by the management system, a software update for the application platform; and updating, by the management system, the instance of the application platform in the workload cluster in the user environment based on the software update using the credential data to access the user environment in response to the detecting of the software update.

2. The computer-implemented method of claim 1, wherein the deployed instance of the application platform is configured to:

receive another user request for creation of a database instance from a computing device of a user, the user being associated with the user account; and create the database instance in the workload cluster in the user environment based on the other user request.

3. The computer-implemented method of claim 2, wherein the limited permission restricts the management system from accessing user environment data stored in the user environment, the user environment data having been stored in the user environment based on use of the database instance by the user associated with the user account.

4. The computer-implemented method of claim 2, wherein the database instance is configured to perform one or more predictive analytics functions.

5. The computer-implemented method of claim 2, wherein the deployed instance of the application platform is configured to:

detect a failure of the database instance; and performing a database recovery operation in response to the detecting of the failure of the database instance.

6. The computer-implemented method of claim 1, wherein the management system resides in a provider environment within the distributed computing system, the provider environment being separate from the user environment and dedicated to a cloud service provider account hosted by the distributed computing system, the cloud service provider account being different from the user account and belonging to the cloud service provider, and the cloud service provider having full administrative privileges in accessing the provider environment.

7. The computer-implemented method of claim 1, wherein the detecting the software update for the application platform comprises detecting an indication of the software update in a data storage within a provider environment within the distributed computing system, the provider environment being separate from the user environment and dedicated to a cloud service provider account hosted by the distributed computing system, the cloud service provider account being different from the user account and belonging to the cloud service provider, and the cloud service provider having full administrative privileges in accessing the provider environment.

8. A system comprising:

at least one hardware processor; and a non-transitory computer-readable medium storing executable instructions that, when executed, cause the at least one processor to perform operations comprising:

receiving, by a management system of a cloud service provider, a user request for creation of an instance of an application platform of the cloud service provider in a user environment within a distributed computing system, the user environment being dedicated to a user account hosted by the distributed computing system, the user request comprising credential data configured to provide the management system with limited permission for accessing the user environment, the limited permission restricting the management system from full administrative privileges in accessing the user environment; and deploying, by the management system, the instance of the application platform of the cloud service provider to a workload cluster in the user environment based on the received user request using the credential data to access the user environment, the instance of the application platform being deployed to be run in the workload cluster in the user environment to provide, from within the user environment, one or more cloud services of the cloud service provider to one or more users associated with the user account;

detecting, by the management system, a software update for the application platform; and updating, by the management system, the instance of the application platform in the workload cluster in the user environment based on the software update using the credential data to access the user environment in response to the detecting of the software update.

9. The system of claim 8, wherein the deployed instance of the application platform is configured to:

receive another user request for creation of a database instance from a computing device of a user, the user being associated with the user account; and create the database instance in the workload cluster in the user environment based on the other user request.

10. The system of claim 9, wherein the limited permission restricts the management system from accessing user environment data stored in the user environment, the user environment data having been stored in the user environment based on use of the database instance by the user associated with the user account.

11. The system of claim 9, wherein the database instance is configured to perform one or more predictive analytics functions.

12. The system of claim 9, wherein the deployed instance of the application platform is configured to:

detect a failure of the database instance; and performing a database recovery operation in response to the detecting of the failure of the database instance.

13. The system of claim 8, wherein the management system resides in a provider environment within the distributed computing system, the provider environment being separate from the user environment and dedicated to a cloud service provider account hosted by the distributed computing system, the cloud service provider account being different from the user account and belonging to the cloud service provider, and the cloud service provider having full administrative privileges in accessing the provider environment.

14. The system of claim 8, wherein the detecting the software update for the application platform comprises detecting an indication of the software update in a data storage within a provider environment within the distributed computing system, the provider environment being separate from the user environment and dedicated to a cloud service provider account hosted by the distributed computing system, the cloud service provider account being different from the user account and belonging to the cloud service provider, and the cloud service provider having full administrative privileges in accessing the provider environment.

15. A non-transitory machine-readable storage medium, tangibly embodying a set of instructions that, when executed by at least one hardware processor, causes the at least one processor to perform operations comprising:
  receiving, by a management system of a cloud service provider, a user request for creation of an instance of an application platform of the cloud service provider in a user environment within a distributed computing system, the user environment being dedicated to a user account hosted by the distributed computing system, the user request comprising credential data configured to provide the management system with limited permission for accessing the user environment, the limited permission restricting the management system from full administrative privileges in accessing the user environment; and
  deploying, by the management system, the instance of the application platform of the cloud service provider to a workload cluster in the user environment based on the received user request using the credential data to access the user environment, the instance of the application platform being deployed to be run in the workload cluster in the user environment to provide, from within the user environment, one or more cloud services of the cloud service provider to one or more users associated with the user account;
  detecting, by the management system, a software update for the application platform; and
  updating, by the management system, the instance of the application platform in the workload cluster in the user environment based on the software update using the credential data to access the user environment in response to the detecting of the software update.

16. The non-transitory machine-readable storage medium of claim 15, wherein the deployed instance of the application platform is configured to:
  receive another user request for creation of a database instance from a computing device of a user, the user being associated with the user account; and
  create the database instance in the workload cluster in the user environment based on the other user request.

17. The non-transitory machine-readable storage medium of claim 16, wherein the limited permission restricts the management system from accessing user environment data stored in the user environment, the user environment data having been stored in the user environment based on use of the database instance by the user associated with the user account.

18. The non-transitory machine-readable storage medium of claim 16, wherein the database instance is configured to perform one or more predictive analytics functions.

19. The non-transitory machine-readable storage medium of claim 15, wherein the management system resides in a provider environment within the distributed computing system, the provider environment being separate from the user environment and dedicated to a cloud service provider account hosted by the distributed computing system, the cloud service provider account being different from the user account and belonging to the cloud service provider, and the cloud service provider having full administrative privileges in accessing the provider environment.

20. The non-transitory machine-readable storage medium of claim 15, wherein the detecting the software update for the application platform comprises detecting an indication of the software update in a data storage within a provider environment within the distributed computing system, the provider environment being separate from the user environment and dedicated to a cloud service provider account hosted by the distributed computing system, the cloud service provider account being different from the user account and belonging to the cloud service provider, and the cloud service provider having full administrative privileges in accessing the provider environment.

* * * * *